US012732871B2

(12) United States Patent
Hart et al.

(10) Patent No.: US 12,732,871 B2
(45) Date of Patent: Sep. 8, 2026

(54) USE-IT-OR-LOSE-IT RESOURCE RESERVATIONS FOR ROAMING

(71) Applicant: Cisco Technology, Inc., San Jose, CA (US)

(72) Inventors: Brian Donald Hart, Sunnyvale, CA (US); Malcolm Muir Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 310 days.

(21) Appl. No.: 18/394,102

(22) Filed: Dec. 22, 2023

(65) Prior Publication Data

US 2024/0298216 A1 Sep. 5, 2024

Related U.S. Application Data

(60) Provisional application No. 63/488,413, filed on Mar. 3, 2023.

(51) Int. Cl.
*H04W 28/26* (2009.01)
*H04W 76/38* (2018.01)

(52) U.S. Cl.
CPC ........... *H04W 28/26* (2013.01); *H04W 76/38* (2018.02)

(58) Field of Classification Search
CPC ..... H04W 28/26; H04W 48/20; H04W 76/38; H04W 84/12
See application file for complete search history.

(56) References Cited

U.S. PATENT DOCUMENTS 9,634,837 B1 * 4/2017 Knecht .................. H04L 61/10
2004/0264409 A1 * 12/2004 Lee ........................ H04L 47/70 370/329

(Continued)

FOREIGN PATENT DOCUMENTS

EP 4145947 A1 3/2023

OTHER PUBLICATIONS

Z. Xu, Z. Ye, S. V. Krishnamurthy, S. K. Tripathi, and M. Molle, "A new adaptive channel reservation scheme for handoff calls in wireless cellular networks," in Networking 2002, Lecture Notes in Computer Science, vol. 2345, Springer, 2002, pp. 672-684.*

(Continued)

*Primary Examiner* — Sam Bhattacharya
(74) *Attorney, Agent, or Firm* — Polsinelli P.C.

(57) ABSTRACT

Disclosed herein are systems, methods, and computer-readable media for minimizing pre-roaming resource reservations. In one aspect, it is determined that a client device connected to a first Access Point (AP) will roam, based on the determination, generating a list of APs that are roam candidates supportive of one or more resources needed by the client device, issuing a reservation request to the roam candidates, where the reservation request includes a timeout feature that persists the reservation at each AP on the list of APs for a set period of time, determining that a second AP within the list of APs will honor the reservation request, and automatically withdrawing the reservation request when the timeout feature has expired and the client device has not connected to the second AP, where the withdrawal of the reservation request frees up the one or more resources associated with the reservation request at each AP on the list of APs.

20 Claims, 11 Drawing Sheets

200

DETERMINE A CLIENT DEVICE CONNECTED TO A FIRST ACCESS POINT (AP) WILL ROAM 202

BASED ON THE DETERMINATION, GENERATE A LIST OF APS THAT ARE ROAM CANDIDATES SUPPORTIVE OF ONE OR MORE RESOURCES NEEDED BY THE CLIENT DEVICE 204

ISSUE A RESERVATION REQUEST TO THE ROAM CANDIDATES, WHEREIN THE RESERVATION REQUEST INCLUDES A TIMEOUT FEATURE THAT PERSISTS THE RESERVATION AT EACH AP ON THE LIST OF APS FOR A SET PERIOD OF TIME 206

DETERMINE THAT A SECOND AP WITHIN THE LIST OF APS WILL HONOR THE RESERVATION REQUEST 208

AUTOMATICALLY WITHDRAWING THE RESERVATION REQUEST WHEN THE TIMEOUT FEATURE HAS EXPIRED AND THE CLIENT DEVICE HAS NOT CONNECTED TO THE SECOND AP 210

(56) References Cited

U.S. PATENT DOCUMENTS

2007/0002819 A1 1/2007 Sood et al.
2007/0076671 A1 4/2007 Winget et al.
2007/0255834 A1* 11/2007 Abhishek .......... H04W 36/0055 709/226
2008/0123607 A1* 5/2008 Jokela .................. H04L 47/824 455/432.1
2008/0146240 A1* 6/2008 Trudeau ................ H04W 28/16 455/445
2008/0259866 A1* 10/2008 Kostic ..................... H04L 45/24 370/329
2010/0202391 A1* 8/2010 Palanki ................. H04W 72/27 370/329
2012/0142387 A1* 6/2012 Kano ................ H04W 36/0016 455/509
2013/0315145 A1* 11/2013 Bourlas ............. H04W 74/0833 370/328
2017/0134362 A1* 5/2017 Randall ................. H04L 63/083
2017/0311259 A1* 10/2017 Cao .................. H04W 52/0212
2018/0288695 A1 10/2018 Tchigevsky et al.
2022/0240176 A1 7/2022 Gupta et al.
2023/0094149 A1 3/2023 Smith et al.

OTHER PUBLICATIONS

GeeksforGeeks, Sanchhaya Education Private Limited, "Handoff in Cellular Telecommunications", date, Retrieved from: https://www.geeksforgeeks.org/computer-networks/handoff-in-cellular-telecommunications/, 7 pages.

LAN/MAN Standards Committee IEEE Std 802.11r, IEEE Standard for Information technology—Telecommunications and information exchange between systems—Local and metropolitan area networks—Specific requirements; Part 11: Wireless LAN Medium Access Control (MAC) and Physical Layer (PHY) Specifications, Amendment 2: Fast Basic Service Set (BSS) Transition, Jul. 15, 2008, 126 Pages.

* cited by examiner

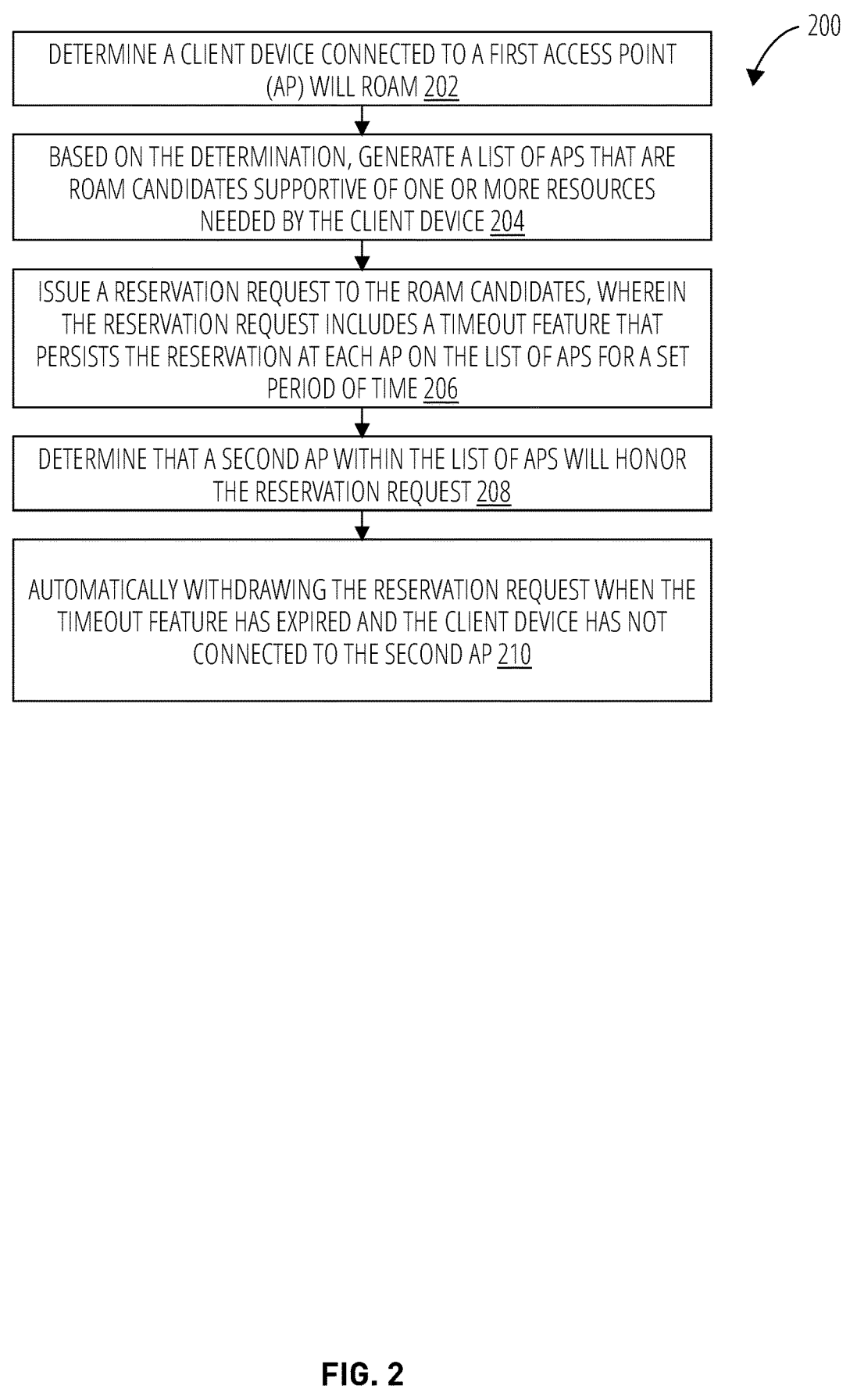

200

DETERMINE A CLIENT DEVICE CONNECTED TO A FIRST ACCESS POINT (AP) WILL ROAM 202

BASED ON THE DETERMINATION, GENERATE A LIST OF APS THAT ARE ROAM CANDIDATES SUPPORTIVE OF ONE OR MORE RESOURCES NEEDED BY THE CLIENT DEVICE 204

ISSUE A RESERVATION REQUEST TO THE ROAM CANDIDATES, WHEREIN THE RESERVATION REQUEST INCLUDES A TIMEOUT FEATURE THAT PERSISTS THE RESERVATION AT EACH AP ON THE LIST OF APS FOR A SET PERIOD OF TIME 206

DETERMINE THAT A SECOND AP WITHIN THE LIST OF APS WILL HONOR THE RESERVATION REQUEST 208

AUTOMATICALLY WITHDRAWING THE RESERVATION REQUEST WHEN THE TIMEOUT FEATURE HAS EXPIRED AND THE CLIENT DEVICE HAS NOT CONNECTED TO THE SECOND AP 210

FIG. 2

RECEIVE, AT A CONTROLLER, A RESPONSE FROM EACH OF THE APS WHETHER EACH AP IS A ROAM CANDIDATE SUPPORTIVE OF THE ONE OR MORE RESOURCES NEEDED BY THE CLIENT DEVICE 412

↓

DETERMINE, AT THE CONTROLLER, THAT THE SECOND AP WITHIN THE LIST OF APS WILL HONOR THE RESERVATION REQUEST 414

↓

RETURN A RESERVATION ID TO THE CLIENT DEVICE AND THE SECOND AP 416

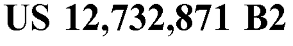
FOR EACH AP WITHIN THE LIST OF APS, NEGOTIATE AMONG OTHER APS WITHIN THE LIST OF APS WHICH AP IS A BEST ROAM CANDIDATE SUPPORTIVE OF THE ONE OR MORE RESOURCES NEEDED BY THE CLIENT DEVICE 604
REACH A CONSENSUS DECISION AMONG THE LIST OF APS THAT THE SECOND AP WILL HONOR THE RESERVATION REQUEST 606
RETURN A RESERVATION ID TO THE CLIENT DEVICE ASSOCIATED WITH THE SECOND AP 608
FIG. 6

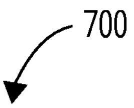

FOR EACH AP WITHIN THE LIST OF APS, NEGOTIATE AMONG OTHER APS WITHIN THE LIST OF APS WHICH AP IS A BEST ROAM CANDIDATE SUPPORTIVE OF THE ONE OR MORE RESOURCES NEEDED BY THE CLIENT DEVICE 704

↓

RECEIVE A DETERMINATION FROM AT LEAST ONE AP WITHIN THE LIST OF APS THAT THE SECOND AP WILL HONOR THE RESERVATION REQUEST BASED ON THE NEGOTIATION AMONG THE LIST OF APS 706

↓

BASED ON THE NEGOTIATION AMONG THE LIST OF APS, IDENTIFY THAT THE ONE OR MORE RESOURCES CAN BE SUPPORTED BY THE SECOND AP IF A SECOND CLIENT DEVICE CURRENTLY CONNECTED WITH THE SECOND AP IS MOVED TO A THIRD AP WITHIN THE LIST OF APS 708

↓

MOVE A CONNECTION OF THE SECOND CLIENT DEVICE FROM THE SECOND AP TO THE THIRD AP 710

↓

BASED ON MOVING THE CONNECTION, HONOR THE RESERVATION REQUEST WITH THE CLIENT DEVICE BY RETURNING A RESERVATION ID 712

FIG. 7

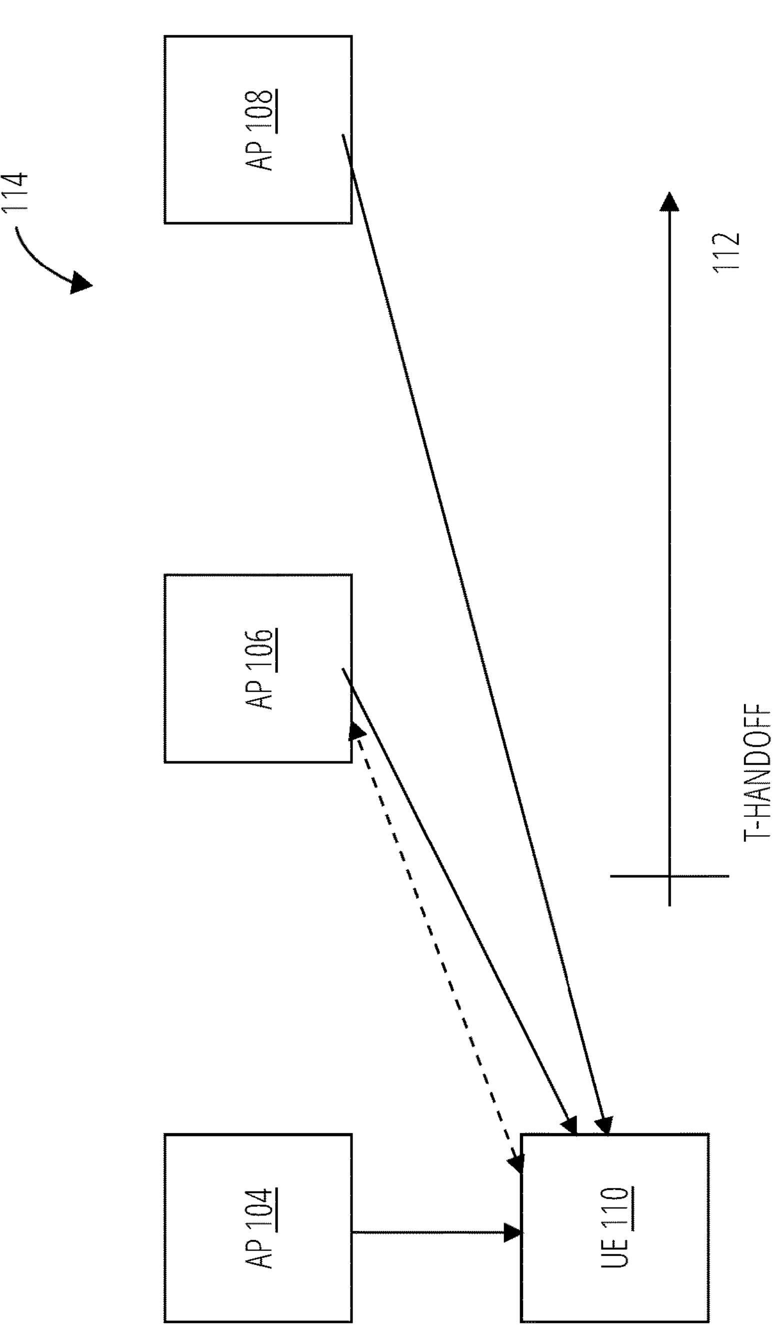
114
AP 108
AP 106
AP 104
UE 110
112
T-HANDOFF
FIG. 8

RECEIVE, AT THE CLIENT DEVICE, A RESPONSE/ADVERTISEMENT FROM EACH OF THE APS WITH THE AP'S GENERAL CAPABILITIES TO DETERMINE SPECIFIC RESOURCE ALLOCATION CAPABILITIES. 904

↓

SELECT, AT THE CLIENT DEVICE, THE SECOND AP 906

↓

SEND THE RESERVATION REQUEST TO THE SECOND AP BASED ON THE SELECTION 908

USE-IT-OR-LOSE-IT RESOURCE RESERVATIONS FOR ROAMING

CROSS-REFERENCE TO RELATED APPLICATIONS

This application claims priority to U.S. Provisional Patent Application No. 63/488,413, filed Mar. 3, 2023, the full disclosure of which is incorporated herein by reference in its entirety.

TECHNICAL FIELD

The subject matter of this disclosure relates in general to the field of computer networking, and more particularly, to authentication and onboarding of devices in a multi-cloud fifth-generation (5G) cellular service deployment.

BACKGROUND

Basic Service Set (BSS) Transition Management enables an Access Point (AP) to request a transition to another AP, or suggests a set of preferred APs, due to network load balancing or BSS termination. In wireless networking, an AP is a device that connects wireless devices (such as laptops, smartphones, or tablets) to a wired network. It serves as a bridge between wireless clients and the wired network, allowing these devices to access resources like the internet or networked services. If an AP device contains a host processor complex connected to multiple radio devices, then an AP Multi-Link Device (MLD), for example, is a logical entity (roughly at the host level) with multiple affiliated (logical) IEEE APs (roughly at the radio level).

The association of a client (e.g., a non-AP MLD has a number of resources assigned. When assigned, they are explicitly unavailable to other clients and/or implicitly unavailable to other clients because they consume AP device resources (e.g., buffer space, time slots, etc.), and so fewer such resources are available to other clients. These range from the anodyne to the intrusive, and from barely-used features to always-used features such as: Access Identifiers (AID), Block Ack (BA) agreements, target wait time (TWT) agreement, restricted target wait time (R-TWT) agreements, Traffic Specification (TSPEC) agreements, Stream Classification Service (SCS)/Quality of Service (QoS) characteristics-related resources, Unscheduled Automatic Power Save Delivery (UAPSD) agreements, etc. Such features may be described by parameters, such as the max BA window size.

When a client roams or is in the process of deciding to transition from a serving AP to another AP, the client wants to ensure it has the same resources (as defined by the resource parameters) with a minimum service capability available at the target AP MLD. For example, the client may want to ensure that it has the same resources—e.g., a TWT agreement with a minimum service interval of 20 msec, a service period of 3 msec, etc. The client ensures it has the resources it needs by reserving (or pre-allocating before association) those resources at the target AP MLD and/or several potential target AP MLDs (e.g. within beacon reception range). Since clients might roam to a target AP MLD after a short or long delay, or sometimes never, an AP MLD might allocate resources to hundreds of nearby clients that are currently unassociated to it and will remain that way for a period of time-such as the next second/minute/hour. Then the AP MLD has few resources to service actual associated clients and the client scale of the AP MLD is diminished.

What is needed is a way to provide clients with assurance of resources being available before roaming without diminishing the client scale of the AP MLD.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2 illustrates a routine in which a client device will determine whether to transition to another AP MLD or non-MLD AP in accordance with an example embodiment.

FIG. 6 illustrates a routine 600 in which transitioning a client device to another AP MLD or non-MLD AP is determined by consensus in accordance with an example embodiment.

FIG. 7 illustrates a routine 700 in which transitioning a client device to another AP MLD or non-MLD AP is determined by negotiation among the APs in accordance with an example embodiment.

FIG. 8 illustrates an example architecture in which the client device determines whether to transition to another AP MLD or non-MLD AP in accordance with an example embodiment.

DETAILED DESCRIPTION

Figure 1:
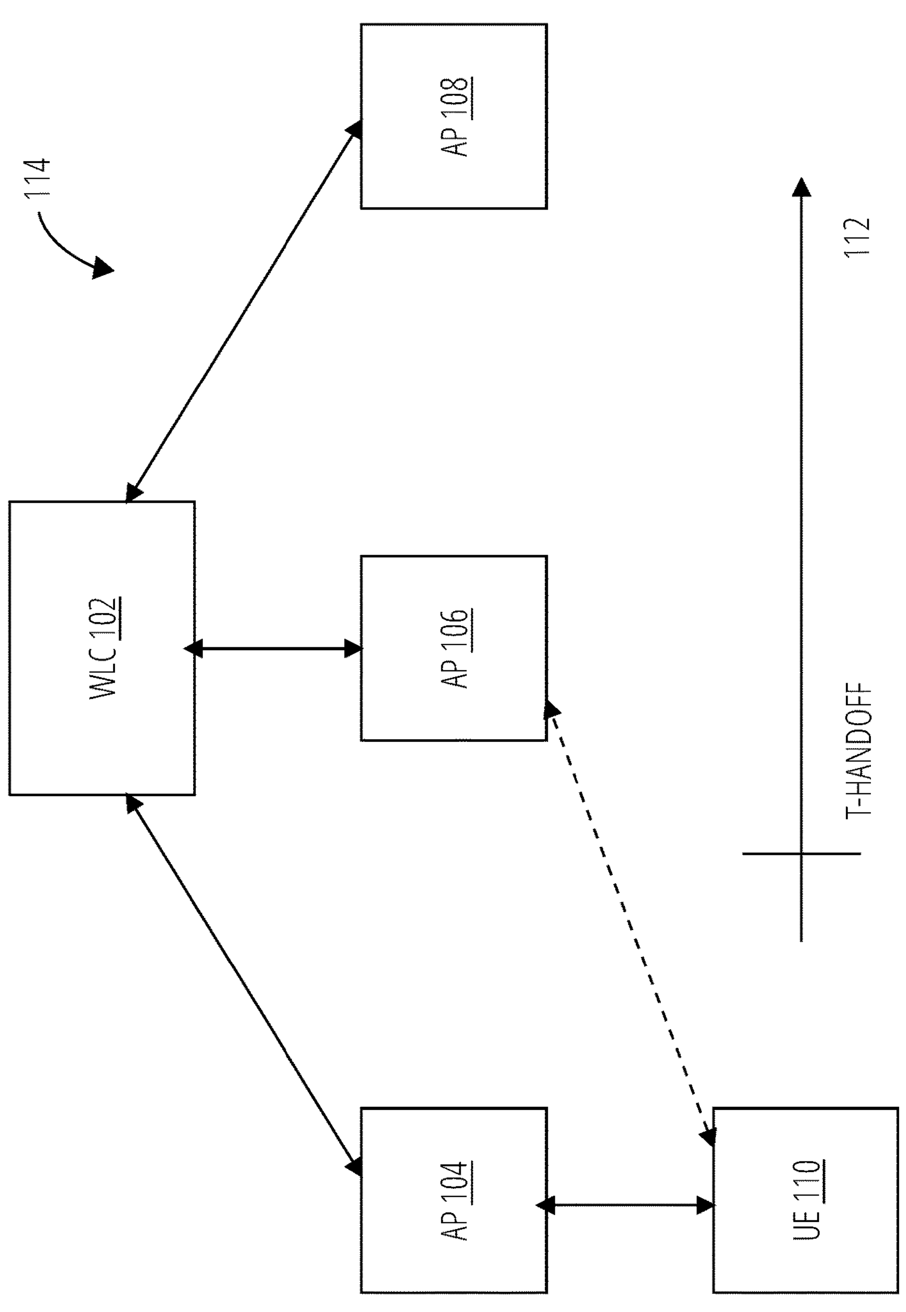
FIG. 1 illustrates an example architecture in which a client device will determine whether to transition to another AP MLD or non-MLD AP in accordance with an example embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The present disclosure is directed to telecommunications techniques for roaming between available networks, and more specifically for use-it-or-lose-it resource reservations for clients when roaming.

In one aspect, a method includes determining a client device connected to a first Access Point (AP) will roam, based on the determination, generating a list of APs that are roam candidates supportive of all, a portion of resources needed, and/or a preferred one or more resources needed by the client device, issuing a reservation request to the roam candidates, where the reservation request includes a timeout feature that persists the reservation at each AP on the list of APs for a set period of time, determining that a second AP within the list of APs will honor the reservation request, and automatically withdrawing the reservation request when the timeout feature has expired and the client device has not connected to the second AP, where the withdrawal of the reservation request frees up all, a portion of the resources needed, and/or the preferred one or more resources associated with the reservation request at each AP on the list of APs. Additionally and/or alternatively, in some embodiments, the client device can be notified that the reservation request when the timeout feature has expired and/or that the reservation request has been withdrawn.

In another aspect, the method further includes for each AP within the list of APs, negotiating among other APs within the list of APs which AP is a best roam candidate supportive of the one or more resources needed by the client device, and receiving a determination from at least one AP within the list of APs that the second AP will honor the reservation request based on the negotiation among the list of APs.

In another aspect, the method further includes based on the negotiation among the list of APs, identifying that the one or more resources can be supported by the second AP if a second client device currently connected with the second AP is moved to a third AP within the list of APs, moving a connection of the second client device from the second AP to the third AP, and based on moving the connection, honoring the reservation request with the client device by returning a reservation ID.

In another aspect, the method further includes monitoring a number of timeout feature expirations associated with the client device, and flagging the client device as a potential abuser based on the number of timeout feature expirations exceeding a threshold value.

In another aspect, the reservation request of the client device is honored at sequentially later time periods when the client device is flagged as the potential abuser.

In another aspect, the reservation request of the client device is prohibited when the client device is flagged as the potential abuser.

In another aspect, the method includes receiving, at the client device, a response from each of the APs whether each AP is a roam candidate supportive of the one or more resources needed by the client device, selecting, at the client device, the second AP, and sending the reservation request to the second AP based on the selection.

In another aspect, the method further includes receiving, at a controller, a response from each of the APs whether each AP is a roam candidate supportive of the one or more resources needed by the client device, determining, at the controller, that the second AP within the list of APs will honor the reservation request, and returning a reservation ID to the client device and the second AP.

In another aspect, the method further includes for each AP within the list of APs, negotiating among other APs within the list of APs which AP is a best roam candidate supportive of the one or more resources needed by the client device, reaching a consensus decision among the list of APs that the second AP will honor the reservation request, and returning a reservation ID to the client device associated with the second AP.

In one aspect, a computing apparatus includes a processor and a memory storing instructions that, when executed by the processor, configure the apparatus to determine a client device connected to a first Access Point (AP) will roam, and based on the determination, generate a list of APs that are roam candidates supportive of one or more resources needed by the client device, issue a reservation request to the roam candidates, where the reservation request includes a timeout feature that persists the reservation at each AP on the list of APs for a set period of time, determine that a second AP within the list of APs will honor the reservation request, and automatically withdraw the reservation request when the timeout feature has expired and the client device has not connected to the second AP, where the withdrawal of the reservation request frees up the one or more resources associated with the reservation request at each AP on the list of APs.

In one aspect, a non-transitory computer-readable storage medium includes instructions that when executed by a computer, cause the computer to determine a client device connected to a first Access Point (AP) will roam, and based on the determination, generate a list of APs that are roam candidates supportive of one or more resources needed by the client device, issue a reservation request to the roam candidates, where the reservation request includes a timeout feature that persists the reservation at each AP on the list of APs for a set period of time, determine that a second AP within the list of APs will honor the reservation request, and automatically withdraw the reservation request when the timeout feature has expired and the client device has not connected to the second AP, where the withdrawal of the reservation request frees up the one or more resources associated with the reservation request at each AP on the list of APs.

DESCRIPTION OF EXAMPLE EMBODIMENTS

FIG. 1 illustrates an example architecture in which a client device will determine whether to transition to another AP MLD or non-MLD AP in accordance with an example embodiment. System 114 shows a Wireless Local Area Network (LAN) Controller (WLC) 102 in connection with one or more access points (AP) (e.g., AP 104, AP 106, AP 108, etc.). An AP can signify either or both an AP Multi-Link Device (MLD) or non-MLD AP in all embodiments. While only three APs are shown in the example embodiment, any number of APs spanning a number of geographical areas covered by any number of networks is contemplated. In some embodiments, however, the WLC can be omitted-its functionality can be split between a cloud management platform and individual APs, for example.

WLC 102 can be any networking device used to manage and control multiple APs (AP 104, AP 106, AP 108) in a wireless local area network (WLAN). Roaming can refer to the transition of a wireless client device (e.g., user equipment (UE) 110) from one AP with which the client is exchanging data to another AP within the same WLAN without losing connectivity. WLC 102 can provide centralized control and management of a portion of all of the APs, such as by coordinating the activities of these APs, and ensuring efficient coverage and connectivity within a WLAN. In some embodiments, WLC 102 can also handle the authentication and security aspects of roaming, such as by ensuring that the roaming client device remains authenticated and secure as it moves between APs. WLC 102 can additionally and/or alternatively distribute client devices across multiple APs to load balance the network load effectively (optimizing network performance and providing a seamless experience for users); manage QoS policies to prioritize certain types of traffic, ensuring that critical applications receive the necessary bandwidth and quality even during roaming; and/or provide network administrators with tools to monitor the performance of APs and troubleshoot connectivity issues, including those related to roaming.

AP 104, AP 106, and/or AP 108 can be any networking hardware device that allows Wi-Fi-enabled devices (e.g., UE 110), such as laptops, smartphones, and tablets, to connect wirelessly to a wired network. APs can be used to extend the reach and coverage of a local area network (LAN) and provide wireless connectivity to users within a certain area. AP 104, AP 106, and/or AP 108 can support wireless connectivity features that allow for network expansion. For example, each AP can broadcast wireless signals, creating Wi-Fi networks to which UE 110 can connect. AP 104, AP 106, and/or AP 108 can expand the coverage of an existing wired network by deploying multiple APs in different areas to create a seamless wireless network across a larger area. In some embodiments, AP 104, AP 106, and/or AP 108 may include routing and switching capabilities, allowing them to handle more complex networking tasks in addition to providing wireless connectivity. Moreover, in some embodiments, AP 104, AP 106, and/or AP 108 can be managed and configured remotely by WLC 102, allowing WLC 102 to monitor and control the network's operation, while in other embodiments AP 104, AP 106, and/or AP 108 manage themselves and/or communicate among the APs to reach consensus decisions.

UE 110 can be devices that individuals use to access and connect to a mobile network for various communication services. UE 110, for example, can be endpoint devices and includes a wide range of devices, such as: smartphones, tablets, laptops and computers, Internet of Things (IoT) devices, wireless hotspots, vehicle telematics, Fixed Wireless Access (FWA) Customer Premises Equipment (CPE), etc. UE 110 can encompass any device that individuals and/or organizations use to access mobile networks for voice and data communication services.

FIG. 2 illustrates a routine 200 in which a client device will determine whether to transition to another AP MLD or non-MLD AP in accordance with an example embodiment. The routine 200 can be used in conjunction with FIG. 1, in which UE 110 will roam from one AP to another AP in accordance with an example embodiment. In block 202, routine 200 determines that a client device (UE 110) connected to a first Access Point (AP 104) will roam to a location where a different AP can provide better service within a handoff time (t-handoff 112). For example, routine 200 can include a method for a non-AP MLD "Station" (STA) (herein referred to as "STA") to roam between MLD APs with prior resource allocation assurance (i.e. from a current serving AP to target AP) while minimizing resources overallocated by the system. In some embodiments, an STA can refer to any device or entity that can connect to a wireless network, such as Wi-Fi, and communicate with the network's infrastructure. In the shown instance, UE 110 intends to roam from AP 104 to another AP (e.g., such as AP 106 and/or AP 108).

In block 204, based on the determination that UE 110 intends to roam from AP 104 another AP, routine 200 generates a list of APs that are roam candidates supportive of one or more resources needed by the client device (e.g., supportive of all resources of one or more resources, supportive of all required resources of the one or more resources and/or at least a minimal number of preferred resources, supportive of all required resources of one or more resources, etc.). For example, an STA wishing to reserve resources during a roam first forms a list of APs that are roam candidates supportive of the WLAN reservation capability (e.g., through one or more information elements (IEs) in a Beacon/Probe Response). For those within the same administrative domain (e.g., Extended Service Set Identifier (ESSID), Homogeneous Extended Service Set Identifier (HESSID), Service Set Identifier (SSID), virtual local area network (VLAN), mobility domain (MD), etc.) and supportive of this capability, in block 206, routine 200 issues a reservation request to the best roam candidate (e.g., AP 106). In some embodiments, the WLC 102 forms the list of APs and issues the reservation request to the roam candidate. For example, the current AP reports the resources (with parameters) to the next APs—e.g., orchestrated by the WLC, which allows the STA to issue a reservation request (e.g., via an action frame) to one or more of these candidate APs prior to the roam. The types and/or resources that should persist during the roam with parameters can be, for example (but not limited to): Access Identifiers (AID), Block Ack (BA) agreements, target wait time (TWT) agreement, restricted target wait time (R-TWT) agreements, Traffic Specification (TSPEC) agreements, Stream Classification Service (SCS)/Quality of Service (QoS) characteristics-related resources, Unscheduled Automatic Power Save Delivery (UAPSD) agreements, etc. The set of candidates can in some embodiments be filtered or prioritized by the STA based on any existing metric such as, but not limited to: Received Signal Strength Indicator (RSSI), channel-utilization (CU), etc. In some embodiments, the reservation request to AP 106 includes a timeout feature that persists the reservation at AP 106 on the list of APs for a set period of time.

In block 208, WLC 102 determines that a specific AP within the list of APs will honor the reservation request. In the example shown, WLC 102 determines that AP 106, rather than AP 108, will honor the reservation request sent by WLC 102. AP 104 then communicates with UE 110 to roam to AP 106. After roaming to one of the participating APs, the STA will then claim those resources upon association with one of the participating APs by indicating the appropriate reservation in the association (or dedicated control frames after association). For example, an R-TWT schedule is resumed at AP 106.

In block 210, routine 200 automatically withdraws the reservation request when the timeout feature has expired and if UE 110 has not connected to AP 106, where the withdrawal of the reservation request frees up the one or more resources associated with the reservation request at each AP on the list of APs. The participating APs will then release resources unclaimed by the STA in at least one of two ways: (a) knowledge of a reservation claim at another AP (which can come from one or more of the APs directly, via the WLC, and/or from the client device), and/or (b) reservation timeout.

Figure 3:
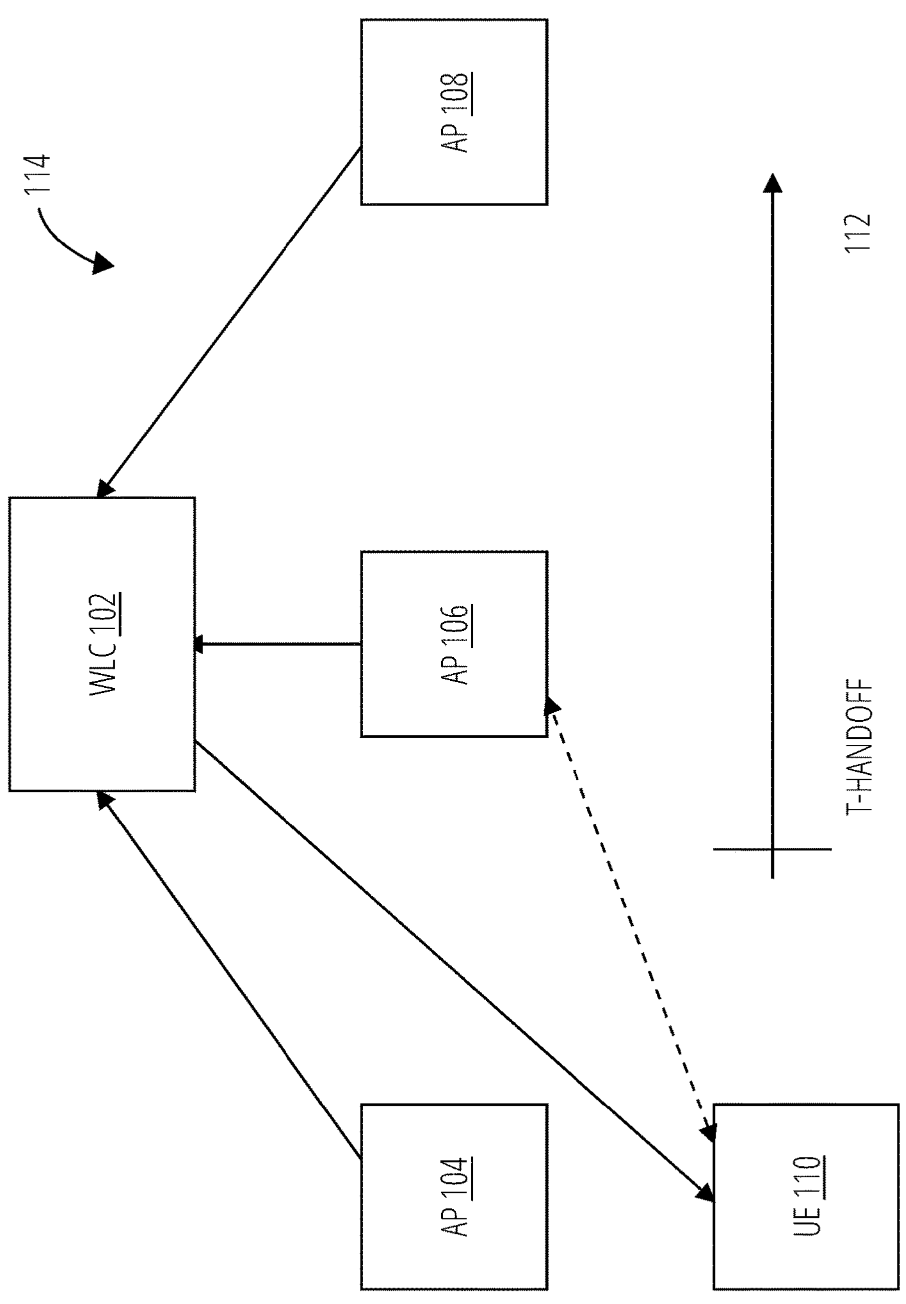
FIG. 3 illustrates an example architecture in which a controller determines whether to transition to another AP MLD or non-MLD AP in accordance with an example embodiment.
Figure 4:
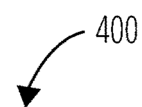
FIG. 4 illustrates a routine 400 in which a controller determines whether to transition to another AP MLD or non-MLD AP in accordance with an example embodiment.

FIG. 3 illustrates an alternative example architecture and FIG. 4 illustrates a routine 400 in which a controller determines whether to transition to another AP MLD or non-MLD AP in accordance with an example embodiment. The controller—WLC 102—minimizes resource wastage from pre-roam reservations by determining and/or selecting an AP candidate for honoring a reservation request, thereby minimizing resource pre-allocation to the selected AP candidate instead of all APs within a range of the UE 110.

In block 412, for example, routine 400 receives, at WLC 102, a response from each of the APs whether each AP is a roam candidate supportive of the one or more resources needed by the client device. In the example shown, AP 104 sends WLC 102 its resource capabilities, AP 106 sends WLC 102 its resource capabilities, and AP 108 sends WLC 102 its resource capabilities. APs additionally send other metrics such as channel utilization, client RSSI etc.

In block 414, WLC 102 forms a list of potential AP candidates and determines that AP 106 will honor the reservation request. Based on this decision, in block 416, WLC 102 returns a reservation ID to UE 110 to initiate roaming to AP 106. For example, WLC 102 issues a reservation request (e.g., via an action frame) to one or more of these candidate APs prior to the roam indicating the types and/or resources and the resource parameters that should persist during the roam (i.e., Access Identifiers (AID), Block Ack (BA) agreements, target wait time (TWT) agreement, restricted target wait time (R-TWT) agreements, Traffic Specification (TSPEC) agreements, Stream Classification Service (SCS)/Quality of Service (QoS) characteristics-related resources, Unscheduled Automatic Power Save Delivery (UAPSD) agreements, etc.). The set of candidates can in some embodiments be chosen by the WLC 102 based on any existing metric such as, but not limited to: Received Signal Strength Indicator (RSSI), channel-utilization (CU), etc. In some embodiments, the reservation request to AP 106 includes a timeout feature that persists the reservation at AP 106 on the list of APs for a set period of time.

Figure 5:
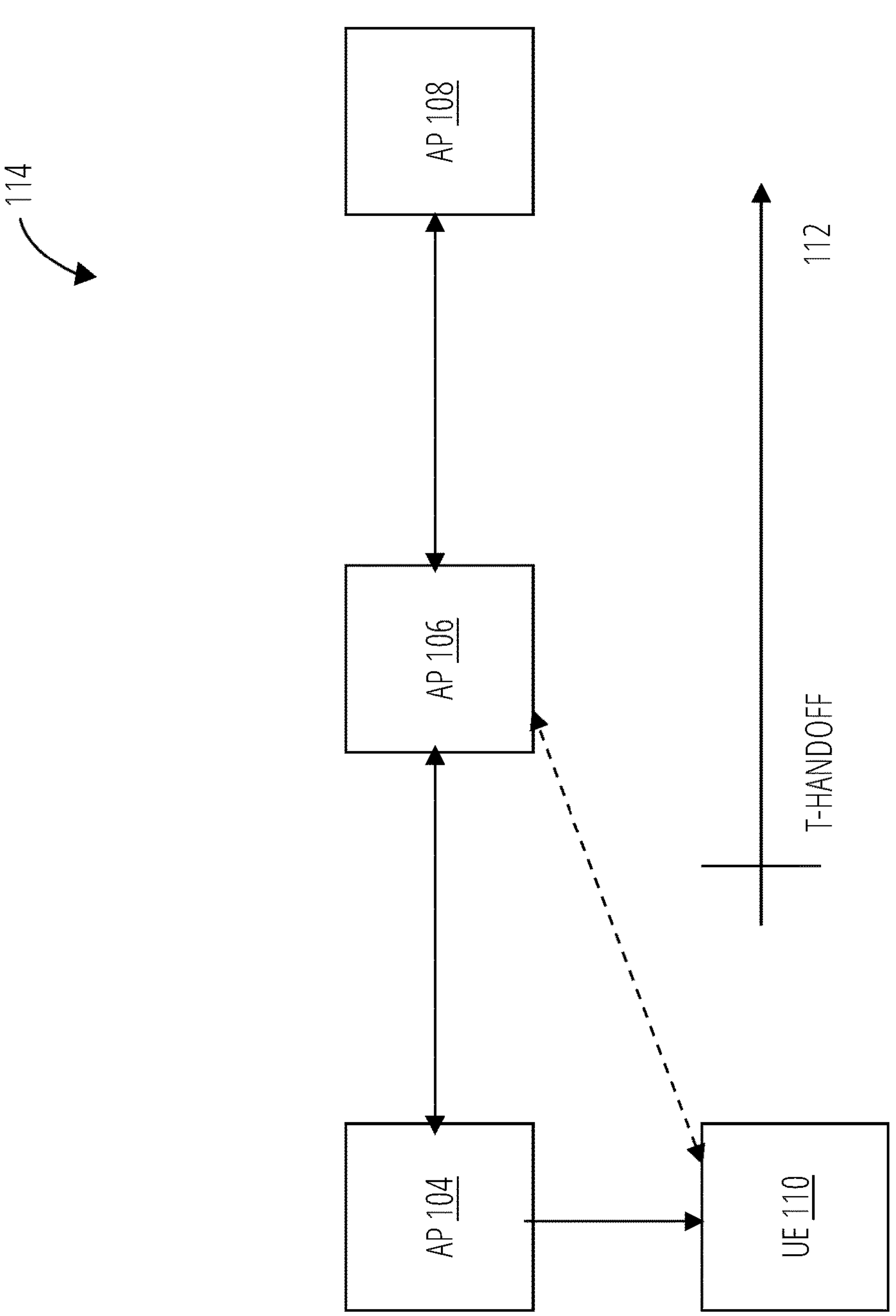
FIG. 5 illustrates an example architecture in which a client device transitioning to another AP MLD or non-MLD AP is determined by consensus in accordance with an example embodiment.

FIG. 5 illustrates an example architecture and FIG. 6 illustrates a routine 600 in which whether to transition to another AP MLD or non-MLD AP is determined by consensus in accordance with an example embodiment. The set of APs in a certain domain (e.g., WLAN) indicated in the STA's reservation request choose amongst themselves (e.g., via Multi AP coordination) which AP will honor the reservation, indicating their participation to the STA by a returned reservation ID (e.g., IE in an action frame) and a time-out (e.g., a TSF) indicating that the resources are only reserved until that specified time and not thereafter (potentially forever if the STA or its flows are critical). In some embodiments, the above consensus decision between the set of APs can be reported back on an individual participating AP basis or (easier for the STA) a single STA representing the WLAN/ESS reservation response.

In block 604, for example, each AP within the list of APs communicates among themselves to determine which AP is a best roam candidate supportive of the one or more resources needed by the client device (e.g., supportive of all resources of one or more resources, supportive of all required resources of the one or more resources and/or at least a minimal number of preferred resources, supportive of all required resources of one or more resources, etc.). For example, in response to UE 110 intending to roam, AP 104, AP 106, and AP 108 communicate amongst themselves to reach a consensus about which AP should honor the reservation request. AP 104, AP 106, and AP 108, prior to the roam, can determine the types and/or resources and the resource parameters that should persist for UE 110 during the roam (i.e., Access Identifiers (AID), Block Ack (BA) agreements, target wait time (TWT) agreement, restricted target wait time (R-TWT) agreements, Traffic Specification (TSPEC) agreements, Stream Classification Service (SCS)/Quality of Service (QoS) characteristics-related resources, Unscheduled Automatic Power Save Delivery (UAPSD) agreements, etc.).

In block 606, routine 600 reaches a consensus decision among the list of APs that a specific AP will honor the reservation request. For example, AP 104, AP 106, and AP 108 can then reach a consensus (e.g., a decision such as a vote over a threshold value) that AP 106 will honor the reservation request based on any existing metric such as, but not limited to: Received Signal Strength Indicator (RSSI), channel-utilization (CU), etc. In some embodiments, the reservation request to AP 106 includes a timeout feature that persists the reservation at AP 106 on the list of APs for a set period of time. In block 608, routine 600 returns a reservation ID to the client device associated with the specific AP (e.g., the reservation ID associated with AP 106 is returned to UE 110). Additionally and/or alternatively, in some embodiments the client device deletes the other resource request agreements and/or optionally the new AP sends delete requests to the other APs. In the latter case, the other APs can delete the agreements in turn, or the other APs' agreements can simply timeout.

FIG. 7 illustrates a routine 700 in which transitioning a client device to another AP MLD or non-MLD AP is determined by negotiation among the APs in accordance with an example embodiment. Negotiation among the APs may happen on a real time or near real time basis due to changing network conditions, changes to resource availability at each AP over a period of time, AP resource management (e.g., if other client devices are associated with the AP), etc.

In order to account for changing conditions that affect AP performance during roaming, in block 704, each AP within the list of APs (e.g., AP 104, AP 106, and AP 108) negotiates among the other APs to determine which AP is the best roam candidate supportive of the one or more resources needed by the client device (e.g., supportive of all resources of one or more resources, supportive of all required resources of the one or more resources and/or at least a minimal number of preferred resources, supportive of all required resources of one or more resources, etc.). Initially, in block 706, routine 700 receives a determination from at least one AP within the list of APs that AP 106 will honor the reservation request based on the negotiation among the list of APs.

However, due to dynamic and changing conditions, such as network conditions, resource availability to each AP, AP resource management, etc., in block 708, based on the continued communication among AP 104, AP 106, and AP 108, a negotiation among them identifies that the one or more needed resources for UE 110 during roaming (e.g., supportive of all resources of one or more resources, supportive of all required resources of the one or more resources and/or at least a minimal number of preferred resources, supportive of all required resources of one or more resources, etc.) can be supported by AP 106 if a second client device (UE not shown) currently connected with AP 106 is moved to a third AP (e.g., AP 108) within the list of APs. In block 710, routine 700 moves a connection of the second client device from AP 106 to AP 108, thus freeing up AP 106 to support the resources needed by UE 110 during roaming. In block 712, based on moving the connection for the second client device, routine 700 honors the reservation request with UE 110 by returning a reservation ID associated with AP 106.

Figure 9:
FIG. 9 illustrates a routine 900 in which the client device determines whether to transition to another AP MLD or non-MLD AP in accordance with an example embodiment.

FIG. 8 illustrates an example architecture and FIG. 9 illustrates a routine 900 in which the client device determines whether to transition to another AP MLD or non-MLD AP in accordance with an example embodiment. The client device—UE 110—minimizes resource wastage from pre-roam reservations by determining and/or selecting an AP candidate for honoring a reservation request from among multiple APs in communication with UE 110, thereby minimizing resource pre-allocation to the selected AP candidate instead of all the AP's within a communication range of the UE 110.

In block 904, for example, the client device receives a response/advertisement (e.g., probe response/beacon) from each of the APs with the APs' general capabilities. The client device then wants to determine if it can get a specific resource allocation for itself. To do so, the client device sends current resource requirements (wrt resources at the current AP) (or in some cases, upgraded/downgraded resource requests wrt resources from the current AP) to the nearby APs wirelessly, and the nearby APs each wirelessly report either yes/no depending on whether they can or cannot support the resource requirements, respectively. Or in some embodiments, upon client request to a serving AP or unsolicited AP, the serving AP sends current resource requests to the nearby APs, where they report yes/no to the serving AP. The serving AP then collates the results and sends the results to the client device in one frame. Additionally and/or alternatively, if the client device determines it wants to upgrade/downgrade its resources, the client device can send upgraded/downgraded resource requests to the serving AP (and thence the serving AP can send to the nearby APs), where the nearby APs can report yes/no to the serving AP; the serving AP collates the results; and then the serving AP sends the results to the client device in one frame.

In block 906, routine 900 selects, at UE 110, the AP 106 as the best candidate to roam. In block 908, routine 900 sends the reservation request to AP 106 based on the selection and initiates the roaming process. For example, UE 110 issues a reservation request (e.g., via an action frame) to AP 106 based on determining prior to the roam the types and/or resources that should are present on each AP and should persist during the roam (i.e., Access Identifiers (AID), Block Ack (BA) agreements, target wait time (TWT) agreement, restricted target wait time (R-TWT) agreements, Traffic Specification (TSPEC) agreements, Stream Classification Service (SCS)/Quality of Service (QoS) characteristics-related resources, Unscheduled Automatic Power Save Delivery (UAPSD) agreements, etc.). AP 106 can, in some embodiments, be chosen by UE 110 based on any existing metric such as, but not limited to, Received Signal Strength Indicator (RSSI), channel-utilization (CU), etc. In some embodiments, the reservation request to AP 106 includes a timeout feature that persists the reservation at AP 106 on the list of APs for a set period of time.

Figure 10:
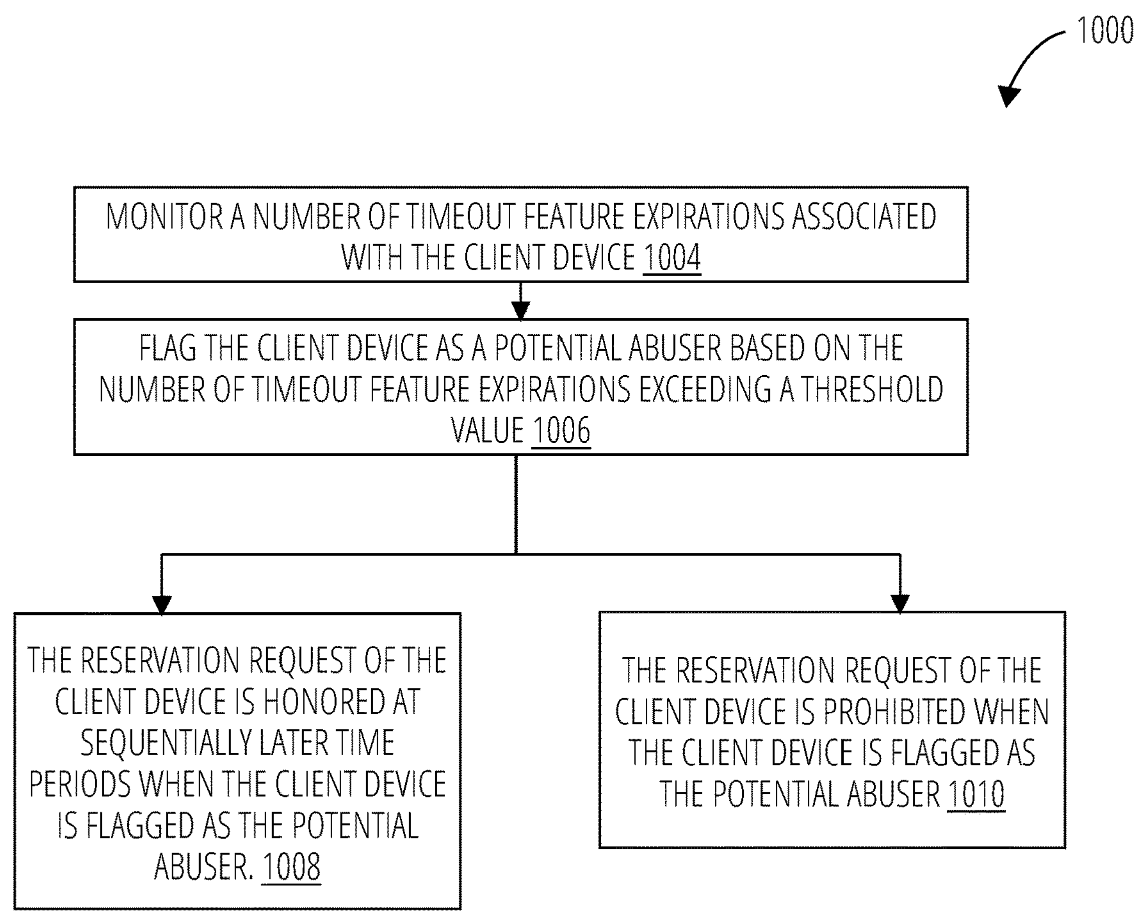
FIG. 10 illustrates a routine 1000 for identifying potential abusers during transitioning between AP MLDs or non-MLD APs in accordance with an example embodiment.

FIG. 10 illustrates a routine 1000 for identifying potential abusers during transitioning between AP MLDs or non-MLD APs in accordance with an example embodiment. The methods and systems of FIGS. 1-9 reduce the resource wastage from pre-roam reservations by cancellation after pre-established reservation expiration. However, in any network, there is the possibility of abuse and (worse) a Denial-of-Service (DOS) attack by unfriendly actors. To limit this abuse, a STA that reserves but does not claim resources (within the specified time) due to no fault of the WLAN (e.g., the STA wasn't dis-associated before it could make the claim) can be marked as a possible abuser. Then for later attempts to reserve the resources again, the candidate AP may restrict the acceptance of such resource reservations: e.g., the request is put to the back of the line; or there is a linearly or exponentially and/or load-dependent increase in the time of the response containing any acceptance. This delay might instead be signaled to the client, so the client realizes it must send a new request after this delay. This bad behavior by a client device could also be reported to a cloud-based WLAN monitoring system for trending/ML purposes and general classification and remedial action. For example, the monitoring can span one or more APs, the monitoring being performed either in a centralized way (e.g., at the WLC, with messages from each AP to the WLC) or a distributed way (with messages between APs).

For example, in block 1004, routine 1000 monitors (e.g., via WLC 102, the UE 110, and/or any of the APs) a number of timeout feature expirations associated with UE 110. In block 1006, routine 1000 flags UE 110 as a potential abuser based on the number of timeout feature expirations exceeding a threshold value. Once UE 110 is flagged as a potential abuser, routine 1000 can take one of multiple routes: in block 1008, the reservation request of UE 110 is honored by AP 106 at sequentially later time periods (e.g., at –2, 4, 6, 8, 10, 12, 14 . . . n seconds; –2, 4, 6, 8, 10, 10, 10 seconds; –2, 4, 8, 16, 32, 64 . . . n seconds; –2, 4, 8, 16, 16, 16 . . . n seconds; etc.); and/or in block 1010, the reservation request of UE 110 is prohibited until UE 110 is no longer flagged as a potential abuser.

In some embodiments, resource requests can be cancelled to prevent a client device from being unfairly flagged as a potential abuser. For example, if the client device has resource requests at 5 APs with a 2 second timeout, and the client device jumps to 1 AP after 1 second, then the client device/new AP will cancel those resource requests at the other APs so they don't count as timeouts.

Figure 11:
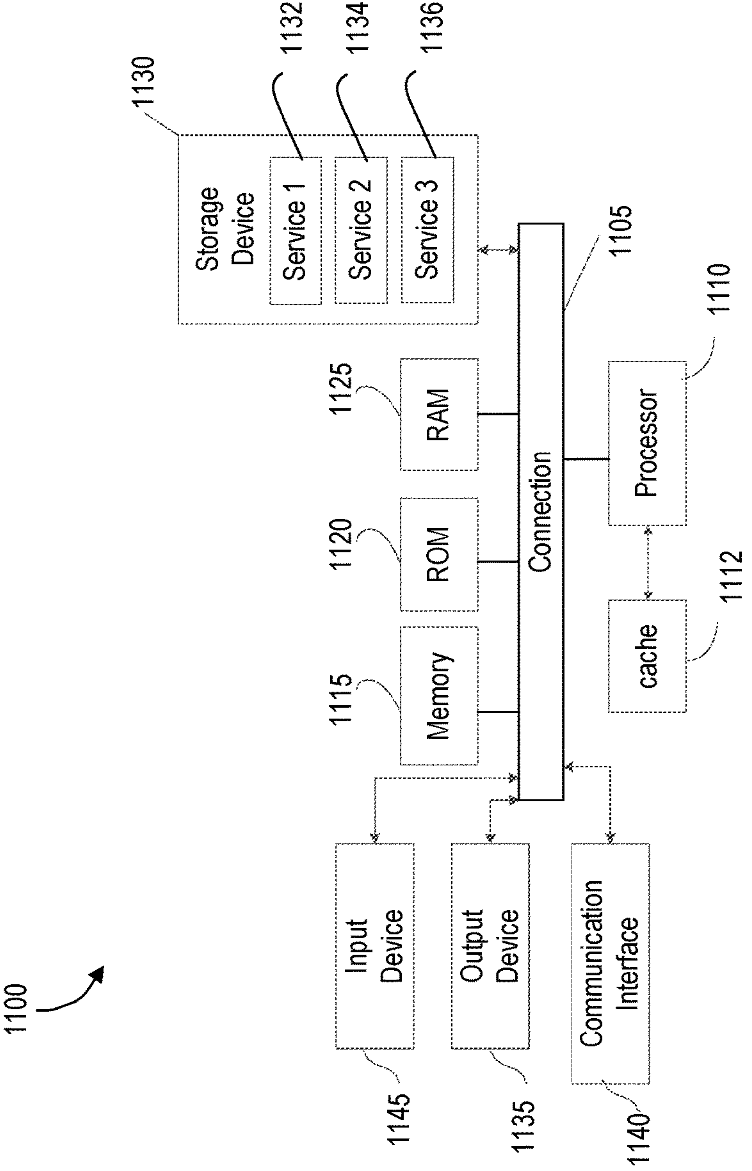
FIG. 11 illustrates an example of computing system in accordance with an example embodiment.

FIG. 11 shows an example of computing system 1100, which can be for example any computing device or any component thereof in which the components of the system are in communication with each other using connection 1105. Connection 1105 can be a physical connection via a bus, or a direct connection into processor 1110, such as in a chipset architecture. Connection 1105 can also be a virtual connection, networked connection, or logical connection.

In some embodiments computing system 1100 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1100 includes at least one processing unit (CPU or processor) 1110 and connection 1105 that couples various system components including system memory 1115, such as read only memory (ROM) 1120 and random access memory (RAM) 1125 to processor 1110. Computing system 1100 can include a cache of high-speed memory 1112 connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms known to those of skill in the art. In some instances, multimodal systems can enable a user to provide multiple types of input/output to communicate with computing system 1100. Computing system 1100 can include communications interface 1140, which can generally govern and manage the user input and system output. There is no restriction on operating on any particular hardware arrangement and therefore the basic features here may easily be substituted for improved hardware or firmware arrangements as they are developed.

Storage device 1130 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1130 can include software services, servers, services, etc., that when the code that defines such software is executed by the processor 1110, it causes the system to perform a function. In some embodiments, a hardware service that performs a particular function can include the software component stored in a computer-readable medium in connection with the necessary hardware components, such as processor 1110, connection 1105, output device 1135, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:

determining a client device connected to a first Access Point (AP) will roam;

based on the determination, generating a list of APs that are roam candidates supportive of one or more resources needed by the client device, the one or more resources comprising AP-local link-layer or association resources having one or more specified service parameters;

issuing a reservation request to the roam candidates, wherein the reservation request includes a timeout feature that persists the reservation at each AP on the list of APs for a set period of time and expires at an expiration time;

determining, prior to association of the client device with a second AP, that the second AP within the list of APs will honor the reservation request, wherein the client device is configured to claim the reservation upon association with the second AP; and automatically withdrawing the reservation request when the timeout feature has expired and the client device has not connected to the second AP, wherein the withdrawal of the reservation request frees up the one or more resources associated with the reservation request at each AP on the list of APs.

2. The method of claim 1, the method further comprising:

for each AP within the list of APs, negotiating among other APs within the list of APs which AP is a best roam candidate supportive of the one or more resources needed by the client device;

receiving a determination from at least one AP within the list of APs that the second AP will honor the reservation request based on the negotiation among the list of APs.

3. The method of claim 2, the method further comprising:

based on the negotiation among the list of APs, identifying that the one or more resources with one or more specified parameters can be supported by the second AP if a second client device currently connected with the second AP is moved to a third AP within the list of APs;

moving a connection of the second client device from the second AP to the third AP; and based on moving the connection, honoring the reservation request with the client device by returning a reservation ID.

4. The method of claim 1, the method further comprising:

monitoring a number of timeout feature expirations associated with the client device; and flagging the client device as a potential abuser based on the number of timeout feature expirations exceeding a threshold value.

5. The method of claim 4, wherein the reservation request of the client device is honored at sequentially later time periods when the client device is flagged as the potential abuser.

6. The method of claim 4, wherein the reservation request of the client device is prohibited when the client device is flagged as the potential abuser.

7. The method of claim 1, the method comprising:

receiving, at the client device, a response from each of the APs whether each AP is a roam candidate supportive of the one or more resources needed by the client device;

selecting, at the client device, the second AP; and sending the reservation request to the second AP based on the selection.

8. The method of claim 1, the method further comprising:

receiving, at a controller, a response from each of the APs whether each AP is a roam candidate supportive of the one or more resources needed by the client device;

determining, at the controller, that the second AP within the list of APs will honor the reservation request; and returning a reservation ID to the client device and the second AP.

9. The method of claim 1, the method further comprising:

for each AP within the list of APs, negotiating among other APs within the list of APs which AP is a best roam candidate supportive of the one or more resources needed by the client device;

reaching a consensus decision among the list of APs that the second AP will honor the reservation request; and returning a reservation ID to the client device associated with the second AP.

10. A computing apparatus comprising:

a processor; and a memory storing instructions that, when executed by the processor, configure the apparatus to:

determine a client device connected to a first Access Point (AP) will roam;

based on the determination, generate a list of APs that are roam candidates supportive of one or more resources needed by the client device, the one or more resources comprising AP-local link-layer or association resources having one or more specified service parameters;

issue a reservation request to the roam candidates, wherein the reservation request includes a timeout feature that persists the reservation at each AP on the list of APs for a set period of time and expires at an expiration time;

determine, prior to association of the client device with a second AP, that the second AP within the list of APs will honor the reservation request, wherein the client device is configured to claim the reservation upon association with the second AP; and automatically withdraw the reservation request when the timeout feature has expired and the client device has not connected to the second AP, wherein the withdrawal of the reservation request frees up the one or more resources associated with the reservation request at each AP on the list of APs.

11. The computing apparatus of claim 10, wherein the instructions further configure the apparatus to:

for each AP within the list of APs, negotiate among other APs within the list of APs which AP is a best roam candidate supportive of the one or more resources needed by the client device;

receive a determination from at least one AP within the list of APs that the second AP will honor the reservation request based on the negotiation among the list of APs.

12. The computing apparatus of claim 11, wherein the instructions further configure the apparatus to:

based on the negotiation among the list of APs, identify that the one or more resources can be supported by the second AP if a second client device currently connected with the second AP is moved to a third AP within the list of APs;

move a connection of the second client device from the second AP to the third AP; and based on moving the connection, honor the reservation request with the client device by returning a reservation ID.

13. The computing apparatus of claim 10, wherein the instructions further configure the apparatus to:

monitor a number of timeout feature expirations associated with the client device; and flag the client device as a potential abuser based on the number of timeout feature expirations exceeding a threshold value.

14. The computing apparatus of claim 13, wherein the reservation request of the client device is honored at sequentially later time periods when the client device is flagged as the potential abuser.

15. The computing apparatus of claim 13, wherein the reservation request of the client device is prohibited when the client device is flagged as the potential abuser.

16. A non-transitory computer-readable storage medium, the computer-readable storage medium including instructions that when executed by a computer, cause the computer to:

determine a client device connected to a first Access Point (AP) will roam;

based on the determination, generate a list of APs that are roam candidates supportive of one or more resources needed by the client device, the one or more resources comprising AP-local link-layer or association resources having one or more specified service parameters;

issue a reservation request to the roam candidates, wherein the reservation request includes a timeout feature that persists the reservation at each AP on the list of APs for a set period of time and expires at an expiration time;

determine, prior to association of the client device with a second AP, that the second AP within the list of APs will honor the reservation request, wherein the client device is configured to claim the reservation upon association with the second AP; and automatically withdraw the reservation request when the timeout feature has expired and the client device has not connected to the second AP, wherein the withdrawal of the reservation request frees up the one or more resources associated with the reservation request at each AP on the list of APs.

17. The non-transitory computer-readable storage medium of claim 16, wherein the instructions further cause the computer to:

for each AP within the list of APs, negotiate among other APs within the list of APs which AP is a best roam candidate supportive of the one or more resources needed by the client device;

receive a determination from at least one AP within the list of APs that the second AP will honor the reservation request based on the negotiation among the list of APs.

18. The non-transitory computer-readable storage medium of claim 17, wherein the instructions further cause the computer to:

based on the negotiation among the list of APs, identify that the one or more resources can be supported by the second AP if a second client device currently connected with the second AP is moved to a third AP within the list of APs;

move a connection of the second client device from the second AP to the third AP; and based on moving the connection, honor the reservation request with the client device by returning a reservation ID.

19. The non-transitory computer-readable storage medium of claim 16, wherein the instructions further cause the computer to:

monitor a number of timeout feature expirations associated with the client device; and flag the client device as a potential abuser based on the number of timeout feature expirations exceeding a threshold value.

20. The non-transitory computer-readable storage medium of claim 19, wherein the reservation request of the client device is honored at sequentially later time periods when the client device is flagged as the potential abuser.

* * * * *